(12) United States Patent
Hollander et al.

(10) Patent No.: US 7,550,725 B2
(45) Date of Patent: Jun. 23, 2009

(54) MULTI-LASER SYSTEM

(75) Inventors: Milton Barnard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 294 days.

(21) Appl. No.: 11/513,954

(22) Filed: Aug. 31, 2006

(65) Prior Publication Data

US 2006/0291531 A1    Dec. 28, 2006

Related U.S. Application Data

(63) Continuation-in-part of application No. 10/864,696, filed on Jun. 9, 2004, now Pat. No. 7,307,255.

(60) Provisional application No. 60/478,935, filed on Jun. 16, 2003.

(51) Int. Cl.
*G01K 7/00* (2006.01)
*G01J 5/00* (2006.01)

(52) U.S. Cl. .................. 250/338.1; 374/121; 374/130

(58) Field of Classification Search .............. 250/338.1; 374/120, 121, 130
See application file for complete search history.

(56) References Cited

U.S. PATENT DOCUMENTS 4,315,150 A * 2/1982 Darringer et al. ......... 250/338.1
4,494,881 A * 1/1985 Everest ..................... 374/124
5,172,978 A * 12/1992 Nomura et al. ............ 374/130
6,196,714 B1 * 3/2001 Bellifemine et al. ....... 374/121
6,234,669 B1 * 5/2001 Kienitz et al. ............. 374/130
2004/0196888 A1 * 10/2004 Musbach et al. .......... 374/120

* cited by examiner

*Primary Examiner*—David P Porta
*Assistant Examiner*—Mark R Gaworecki
(74) *Attorney, Agent, or Firm*—William A. Drucker

(57) ABSTRACT

Hand held infrared measurement devices are disclosed, having at least two separated laser sighting emitters (2), which together mark and define a sighting area on a target surface (7,7',7"). In an embodiment of the invention, separate lasers (2) are provided which each produce a beam (6) used to illuminate a respective separate optical beam directing element (4), mounted between each laser emitter and the target surface (7,7',7"). The element may be, for example, any of the optical glass fibers, a prism, or a lens, such as a diffraction beam splitter lens, or a refractive lens, each element directing laser light onto the target surface to produce a visually perceptible target marking. The element is preferably made of optical material such as glass or plastic (e.g., methyl methacrylate). Separate laser emitters permit greater brightness displayed on the target within safe operation limits than use of a single laser alone, even with a beam splitter. The laser emitters may each be separately powered and may also each be switched on or off or changed in brightness.

9 Claims, 4 Drawing Sheets

FAR FIELD OF VIEW OPTICAL / LASER SYSTEM

TWO LASER CONFIGURATION

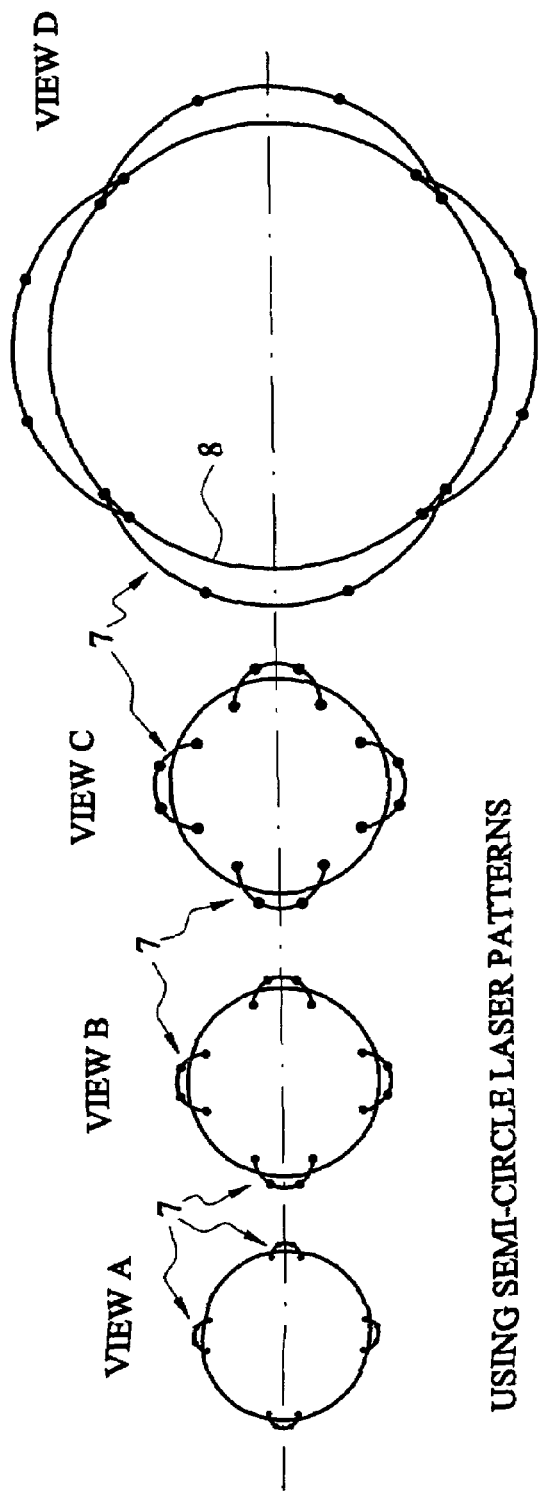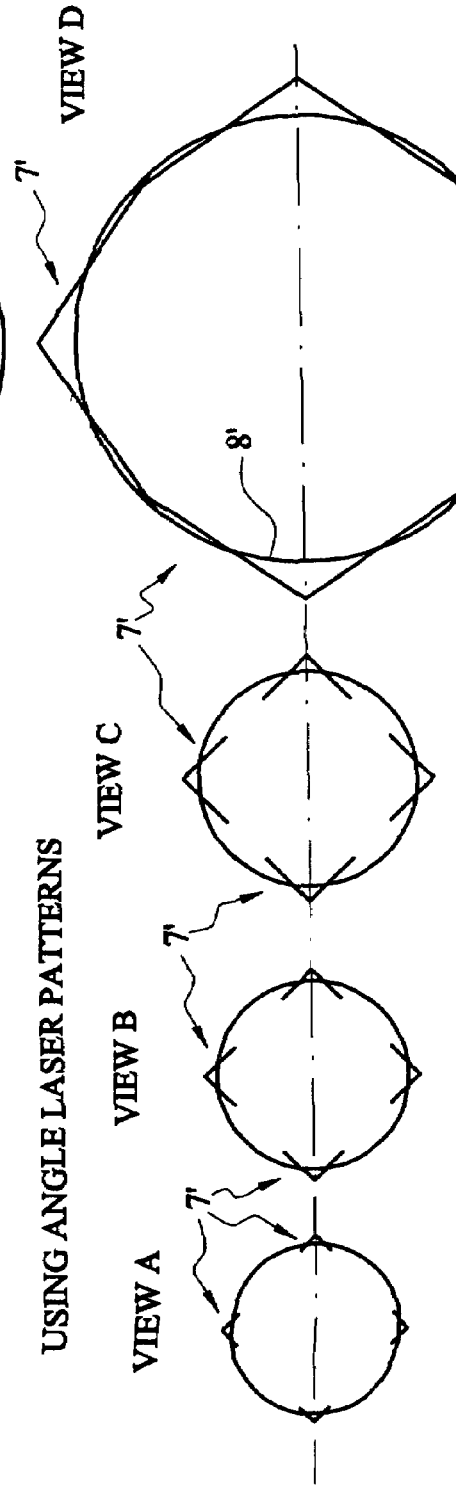
FIG. 3
FAR FIELD OF VIEW OPTICAL SYSTEM, FOUR LASER CONFIGURATION

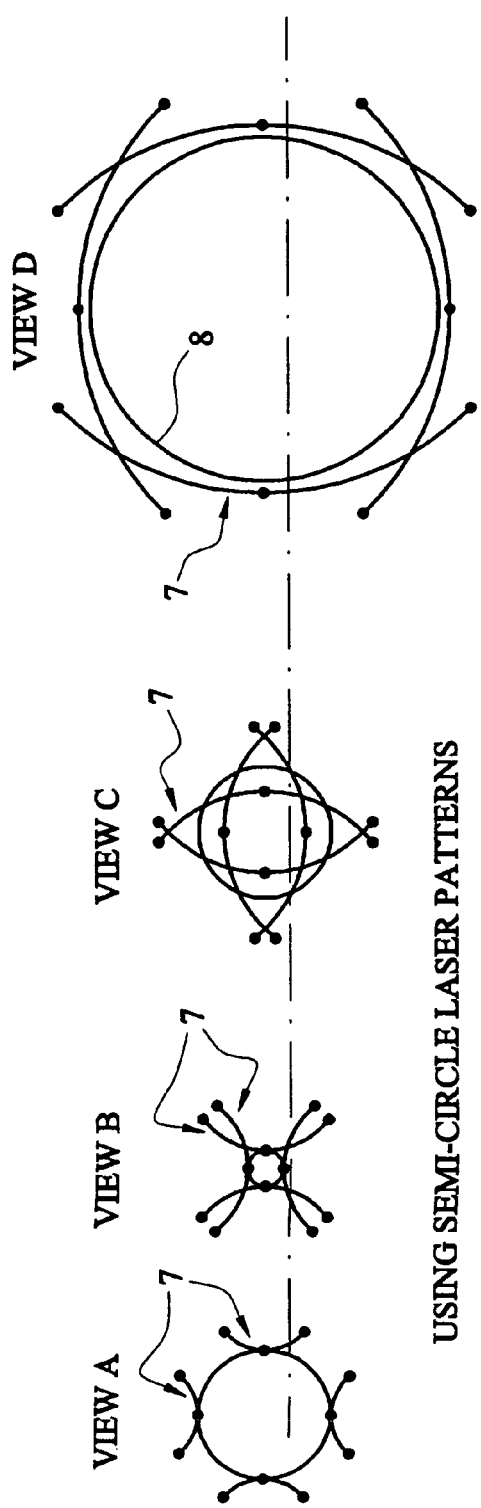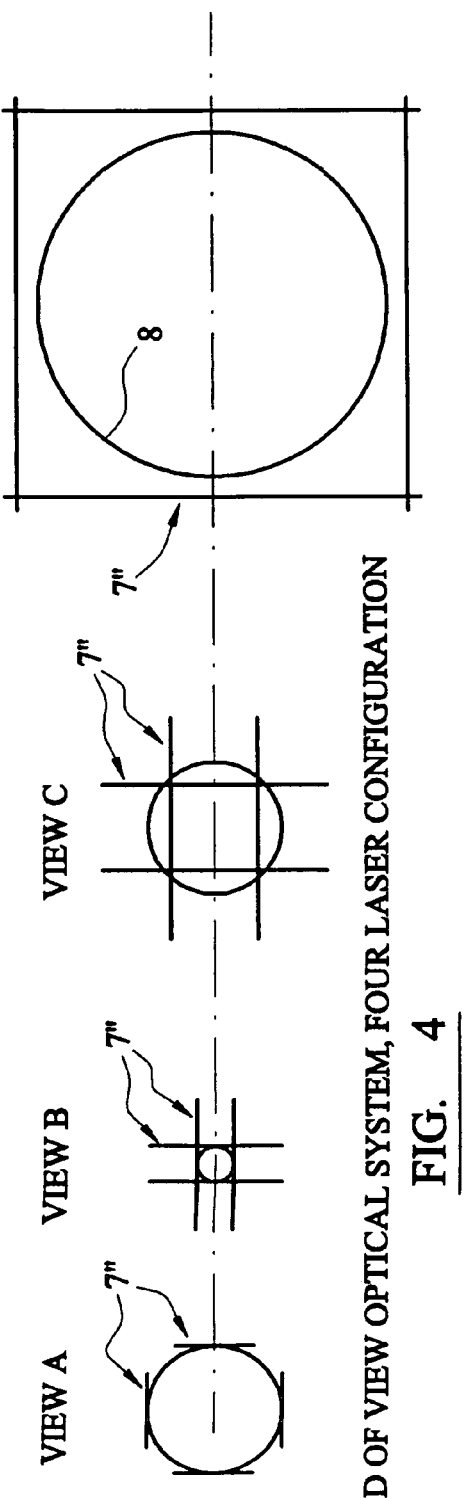
USING SEMI-CIRCLE LASER PATTERNS
USING LINE LASER PATTERNS
CLOSE FIELD OF VIEW OPTICAL SYSTEM, FOUR LASER CONFIGURATION
FIG. 4

MULTI-LASER SYSTEM

REFERENCE TO RELATED APPLICATIONS

This application is a continuation-in-part of our application Ser. No. 10/864,696, filed on Jun. 9, 2004 now U.S. Pat. No. 7,307,255, which is based in part on our U.S. Provisional application No. 60/478,935 filed Jun. 16, 2003.

BACKGROUND OF THE INVENTION

This invention concerns a system of hand-held multiple laser emitters suitable for directing an infrared measurement device onto a target surface.

The invention relates to devices for non-contact temperature measurement which include a detector upon which electromagnetic radiation emanating from a surface measurement spot or energy zone is imaged by known imaging optics, in combination with a laser directed sighting device. The sighting device marks the position and/or size of the measured spot by illumination from at least two laser beams or lines into a visible display pattern originating from separate lasers.

Non-contact infrared measurement devices comprise an infrared detector in combination with an optical system to focus the infrared radiation from the surface being measured onto the detector, together with a laser directed sighting system. In hand held devices it is important for the operator to be able to direct the device at the measurement point. A sighting display on the target surface of laser light formed of lines or dots will outline the measurement area, and/or indicate the center thereof and allow reliable measurement of the thermal energy zone being measured.

There is an upper limit on the power of each laser beam or sighting ray which may be used for sighting such a device. Working conditions such as long distance from the device to the target or obscure atmosphere may require a brighter laser display than is available from a single emitter of limited brightness. The present invention provides at least two separate laser emitters working together to produce a brighter display than that from a single laser.

In an embodiment of the invention multiple laser emitters (2) are provided, and one or more of these emitters may illuminate a beam directing optical element (4), such as a beam splitter, a lens or prism, for example, a diffraction lens or grating and/or a refractive optical element, which directs an illuminating laser light marking display onto a target surface. Splitting a laser beam more than once as above produces more complex patterns of light. A laser line generator may be used with a laser diode to produce a line, vis a vis, a dot. Both lines and dots may comprise the marking display. Multiple lasers cooperating to produce a marking display of selectable brightness using intermediary directing optical elements.

In principle, long range far focusing of the measurement spot image onto the detector is distinguished from closing short range focusing. In the case of long range focusing, the detector is imaged at infinity and in the case of short range focusing it is imaged on a focus plane at a finite distance from the detector. Different related sighting systems are known for close and far focusing and visualization of the measured spot. Marking the outline of the measured spot and/or indicating the center of the measured area by a single laser are known methods of visualization.

In a preferred example of the best mode of carrying out the invention an array of multiple laser emitters and respective optical directing elements is mounted with an infrared detector and infrared optical system on a hand held support; and a plurality of individual lasers is linked, under control of the operator, with on/off and/or power control switching means (electrical, optical or mechanical). At a first switch position, power supply to the lasers is cut off to all or some lasers. At a second switch position, power supply to the lasers is cut off to all or some lasers. At a second switch position all or some of the lasers are powered on. One or more laser beams or sighting rays is preferably also directed at the center of the measurement area to produce a bright spot or central area (FIG. 1-4) to indicate the center of the field of view. When more than one beam strikes a selected location, e.g., the center, a much brighter spot is produced where the beams intersect. The location on the target surface where two or more beams intersect is enhanced in visibility according to the number of impinging beams or sighting rays. One or more laser beams may be further split, e.g. by diffraction, to produce a more complex light pattern or to outline the target and/or to indicate an edge of the detector field of view. For example, one laser beam may indicate the center of the measurement field and at least two further beams may indicate the edges and thereby disclose the calculable measurement area of the zone, which area may then appear on a display means together with temperature and distance measured by the device from laser to target surface.

BRIEF SUMMARY OF THE INVENTION

It is a particular feature of this invention that the operator of the hand held device can select a laser array suited for either close or far focus measurement of temperature from multiple arrays mounted in the instrument. For long range focusing of the detector on a measurement spot at a distant position, e.g., at infinity, the detector is imaged via the infrared optical system and an infrared lens. For close focus near position measurement, e.g., about ten centimeters, a particular focus point for the detector is arranged. A known suitable (e.g., convex) lens is part of the infrared optical system. The sighting system laser array is selectable by the operator for close and/or far focusing. For example, a first pair of lasers is aligned for close focus measurement and/or a separate array of four lasers is disposed for distant measurements.

DESCRIPTION OF THE DRAWINGS

The invention will be described further, by way of example, by reference to the accompanying drawings in which

FIG. 3 comprises diagrammatic representations of the field of view where four laser beams are employed in two configurations; and FIG. 4 is a similar view to FIG. 3 showing two further field of view configurations.

DETAILED DESCRIPTION

Figure 1:
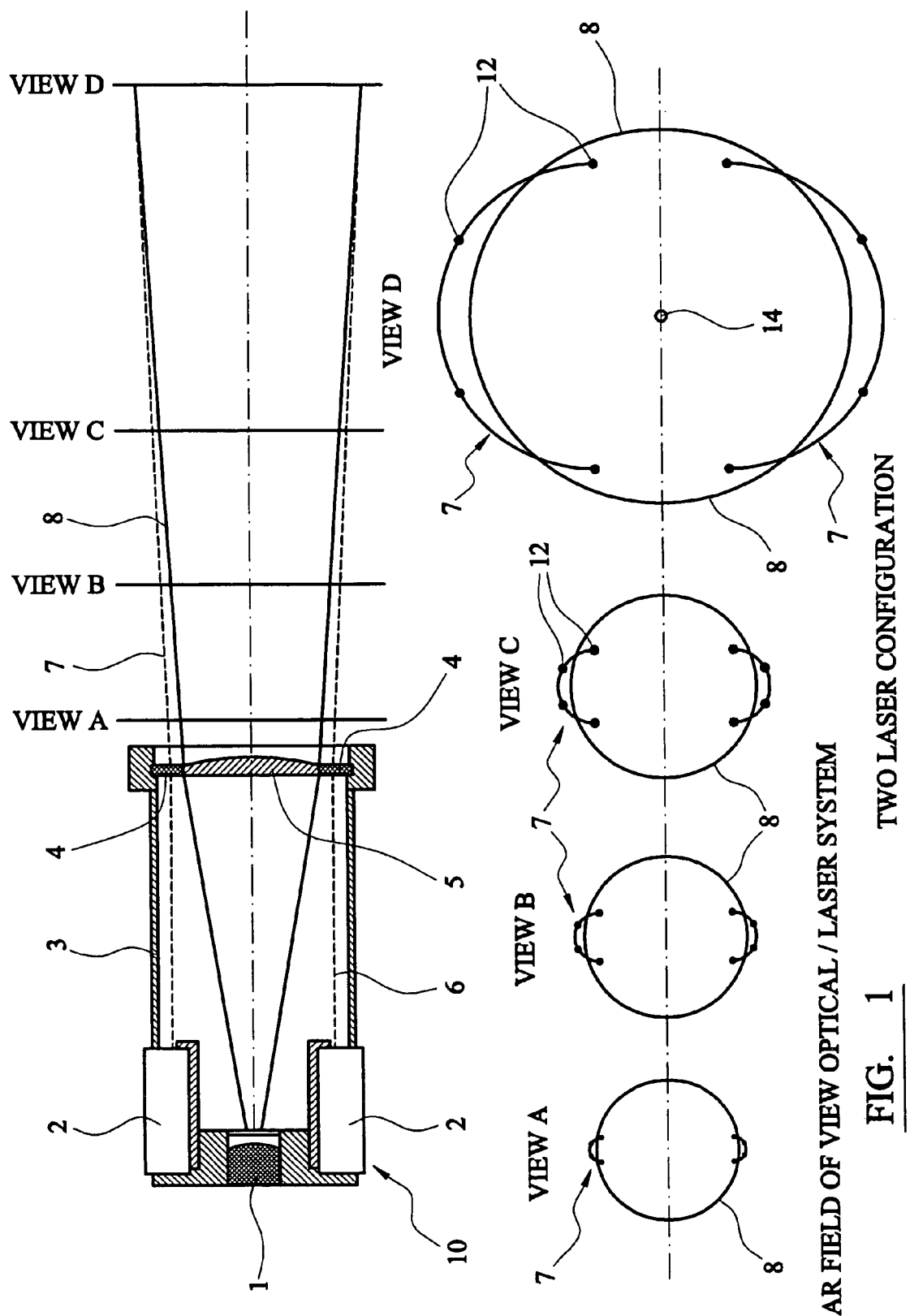
FIG. 1 is a cross-sectional view of the infrared temperature detector including two laser emitters in accordance with the invention.

In the drawings, FIG. 1 illustrates a far field of view optical and laser sighting system for an infrared heat detection instrument or device generally designated (10). The device (10) comprises an infrared detector (1) on which is focused infrared radiation by means of an optical infrared lens (5). The lens (5) is held in a lens housing (3). The lens housing is preferably cylindrical and may support separate laser diode modules including laser line generators and optical elements illuminated by laser beams from emitters directing laser light to the target area.

Each laser emitter module (2) of the laser sighting system produces a laser beam or line (6) which illuminates and passes across an optical element (4), which may be an optical fiber, prism or a lens, such as a diffraction or refraction lens, which in turn directs the laser beam from the emitter (2) onto the measurement target surface to form a visible light marking distribution pattern display and to indicate the position and size of the area of the measurement to the operator. At least two optical elements (4) are preferably disposed at an angle of less than one hundred eighty degrees relative to one another. At least two of said elements may be disposed at an angle of ninety degrees or an acute angle relative to one another. A central illuminated spot on the target is particularly useful to establish the location of the measured area. When two or more beams or laser lines intersect at a point on or near the periphery of the measured zone, the zone area is indicated and the zone is outlined. Display of a central spot together with indication of the edge of the measurement area by laser lines is a particularly elegant mode of indication of the target area. The optical elements (4), when they are beam splitters, may split the beams (6) into a pattern of dots (12) or into laser lines, using known line generator means, which to the operator's eye, form a laser envelope in the form of a semi circle (7), for example. The infrared optical field of view of the detector (1) is defined by a field of view envelope (8); and it is noted that the set up of the laser lenses (4) is such that the laser envelope (7) matches the infrared optical field of view envelope (8) at effectively all points of the operating range of the system, as indicated by the sectional views A, B, C and D. It will be appreciated that the infrared optical envelope (8) is not, in practice, visible to the naked eye of the operator, whereas the laser envelopes (7) are displayed in a pattern on the target surface and are visible.

Figure 2:
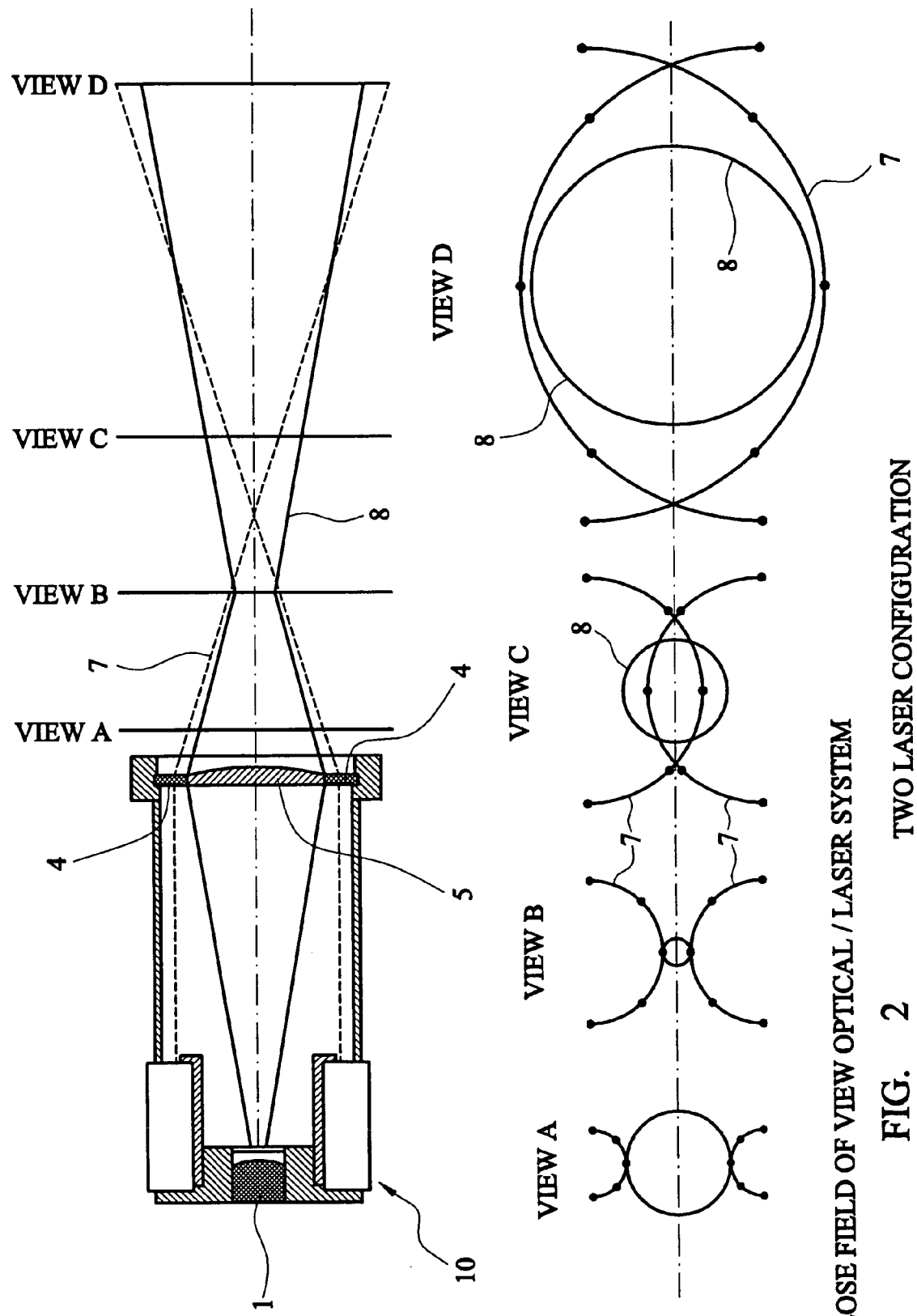
FIG. 2 is a similar view to FIG. 1, wherein the device is configured for close field of view.

In FIG. 2, the device is set up differently to provide a close or near field of view. A lens (5) of the optical system causes the optical field of view to take the configuration illustrated.

In this case, each optical element or lens of the laser sighting system (4) is set up so that the semi-circular laser envelopes (7) are inverted close to the device (10) (views A and B), but the envelopes progressively move toward the pattern seen in FIG. 1 at greater distances (views C and D). In each case the operator is able to locate the center of the optical field of view equidistant between the (visible) laser envelopes (7) and can thus sight the device accurately. The center-point (FIG. 1, 14) is also preferably indicated by one or more beams from separate lasers. When indicated from more than one laser, the then more highly visible center point 14 indicates the intersection location of separate beams.

Referring now to FIG. 3, the device (10) (not shown) incorporates four laser modules (2) producing four laser beams (6) which are directed by lenses (4) to display four semi-circular laser envelopes (7) on the measurement surface, or by selection of a different optical element, prism or lens produce other laser display patterns (7). The field of view configurations in FIG. 3 are in respect of the far field of optical view system. In FIG. 4, in contrast, a close field of view optical system is illustrated with four laser beams (6) producing four sets of laser envelopes (7) which may be semi-circular, as above, or may be linear (7") by selecting the correct configuration of laser directing sighting lens (4). The laser modules (2) are preferably mounted in pairs diagonally opposed to one another. The close view and far view systems can each be constructed and used on independent hand held supports, or else both systems are mounted together on a common support and used selectably by operation of known switching means. Switching may be mechanical, electrical or optical, for example, the device may be rotated or inverted to bring a selected focus system into operation. The separate, near and far systems may operate like the separate barrels of a double barrel shotgun, e.g. under and over or side-by-side. They may also display laser beams on the target surface from either end of an elongated barrel. Another construction incorporates electronic switching for selection and/or activation of an appropriate laser array according to target distance and according to the needed brightness of the display.

In an alternative embodiment, one or more of the modules (2) may be arranged to produce a spot (14) (FIG. 1) at or near the center of the optical field of view (8). A single unsplit laser beam from an individual emitter will be brighter than spots or lines produced by a beam splitter or diffractor from a single emitter and will be visible from a distance farther away. A still brighter spot is produced when more than one laser module each projects a single beam to a location of beam intersection e.g., the central spot position or an edge of the energy zone. A feature of the invention is the brighter marking display of laser light on a selected location of the measurement surface where two or more laser beams cooperate and mutually impinge either serially or simultaneously, e.g., a central or index spot or line. The beams arise from separate laser emitters and preferably at least two laser beams (6) intersect at an angle on the target surface to for a marking display.

The use of four emitters quadruples the power level of the device over use of a single laser and therefor the increased visibility and brightness of the laser envelope is particularly valuable in occluded atmosphere and at great measurement range from the object measured. Emitters are preferably mounted diagonally from each other in pairs. Pulsation of the emitters increases visibility of the display; and this can be done simultaneously for a group of lasers, or serially or alternately from laser to laser, and may also produce a flashing light pattern. Pulsation of the display may occur at points of mutual beam impingement.

The laser sighting system is useful not only to aim the radiometer's optical system, but also to aim an associated cooperating distance measuring rangefinder device, at the target. The rangefinder measures the distance to the target (e.g., optically or with ultrasound) and the measured distance value is fed to the radiometer microprocessor which calculates the field of view and adjusts the focal plane to the target surface. The infrared lens (5) in its mounting (3) is moved along the optical axis closer to or farther from the detector (2). Lens movement may be mechanical as by twisting the housing (3) on a thread or track or by a switch or automatically by moving the lens via a stepper or a DC motor either controlled by the processor or by the rangefinder to the correct position to attain the desired focus. Distance measurement is linked to the electronic selection of a laser array suitable to the selected operation of the optical system for close or far measurement of temperature.

The invention claimed is:

1. Apparatus for remote temperature detection from a measurement spot on a target surface comprising:
    (a) an infrared optical system, comprising an infrared detector and an infrared lens having an optical field of view angle, for imaging electromagnetic radiation onto said detector; and
    (b) a visible light sighting system, incorporated into said optical system, comprising separate sighting modules, each having an independent light source directed onto a separate lens, to form a visible light pattern on said surface to identify and to coincide with the optical field of view of said detector and infrared lens, so that angles of light from said separate lenses match the optical field of view angle; and a far field of view and a close field of view are arranged by separate sighting light sources of said apparatus.

2. Apparatus according to claim 1, wherein each light source is a laser.

3. Apparatus according to claim 1, wherein angles of light from said modules are divergent.

4. Apparatus according to claim 1, wherein the optical imaging system defines a field of view from said detector including a measurement spot on a target surface, the field of view being arranged with respect to the detector from a close field of view near position to a far field of view distant position and from a far field of view distant position to a close field of view near position; and
- a sighting device for marking the position and/or the size of the measurement spot on the target surface, and sighting device comprising at least two light sources that each provides a respective sighting ray; and
- wherein at least one of said respective sighting rays is dedicated to close field of view short range marking and at least one other of said respective sighting rays of the sighting device is dedicated to far field of view long range marking, and
- wherein said sighting device is arranged for close field of view marking and for far field of view marking upon the apparatus being arranged from the near position to the distant position.

5. Apparatus according to claim 4, wherein at least two of the sighting rays are provided for visualization of the measurement spot at the close field of view near position and at least two other sighting rays are provided for visualization of the measurement spot at the far field of view distant position.

6. Apparatus according to claim 1, wherein each of the light sources comprises a respective laser diode.

7. Apparatus according to claim 1 wherein each of the light sources comprises a respective laser, and wherein the angular position of the lasers is arranged relative to one another in said sighting device.

8. Apparatus according to claim 1, wherein said sighting system comprises at least two light sources that each provides a respective sighting system and in which said system is arranged between short range and long range focusing.

9. A field-variable infrared thermometer with a visible targeting device comprising the combination of:
(a) an infrared detector;
(b) a field-variable optical system for producing a detector image on a target surface at a close field of view and at a far field of view, and for delivering infrared radiation from the target surface to the infrared detector; and
(c) visible light source means adapted to produce a light source image having an identifiable pattern on the target surface, said light source image being coincident with the detector image, wherein said identifiable pattern corresponds to the detector field of view.

* * * * *